(12) United States Patent
Cimatti et al.

(10) Patent No.: US 7,832,784 B2
(45) Date of Patent: Nov. 16, 2010

(54) MOTOR VEHICLE PROVIDED WITH A FOLDING TOP

(75) Inventors: Franco Cimatti, Pavullo (IT); Alessandro De Paoli, Pinarolo Po (IT)

(73) Assignee: Ferrari Spa, Modena (IT)

( * ) Notice: Subject to any disclaimer, the term of this patent is extended or adjusted under 35 U.S.C. 154(b) by 704 days.

(21) Appl. No.: 10/583,566

(22) PCT Filed: Dec. 15, 2004

(86) PCT No.: PCT/IB2004/004197

§ 371 (c)(1),
(2), (4) Date: Oct. 12, 2007

(87) PCT Pub. No.: WO2005/061253

PCT Pub. Date: Jul. 7, 2005

(65) Prior Publication Data

US 2008/0116712 A1    May 22, 2008

(30) Foreign Application Priority Data

Dec. 19, 2003 (IT) .......................... BO2003A0762
Feb. 6, 2004 (IT) .......................... BO2004A0056
Jul. 9, 2004 (IT) .......................... BO2004A0429

(51) Int. Cl.
*B60J 7/12* (2006.01)
(52) U.S. Cl. .................................................. 296/107.09
(58) Field of Classification Search ............ 296/107.01, 296/108, 109, 121, 107.09, 107.11, 107.16, 296/107.17
See application file for complete search history.

(56) References Cited

U.S. PATENT DOCUMENTS

| 2,007,873 | A | * | 7/1935 | Paulin ........................ 296/117 |
| 2,704,225 | A | * | 3/1955 | Anschuetz et al. .......... 296/108 |
| 2,785,922 | A | * | 3/1957 | Chika ...................... 296/107.2 |
| 2,794,672 | A | | 6/1957 | Burzi |
| 2,836,457 | A | * | 5/1958 | Berman et al. ......... 296/146.16 |
| 2,939,742 | A | * | 6/1960 | Dardarian et al. ........... 296/108 |
| 4,750,778 | A | * | 6/1988 | Hoban .......................... 296/66 |
| 5,098,148 | A | * | 3/1992 | Hoban .......................... 296/66 |
| 5,897,160 | A | | 4/1999 | Reihl |
| 6,142,555 | A | * | 11/2000 | Huber ................... 296/107.17 |
| 6,149,223 | A | * | 11/2000 | Baessler et al. ........ 296/146.14 |

(Continued)

FOREIGN PATENT DOCUMENTS

DE    195 31 074    9/1996

(Continued)

*Primary Examiner*—Hilary Gutman
(74) *Attorney, Agent, or Firm*—John A. Artz; Dickinson Wright PLLC

(57) ABSTRACT

A motor vehicle provided with a folding top, which is supported by a frame of the motor vehicle and can be set in an open position or in a closed position. The folding top has an element of covering, which is substantially horizontal in the closed position and is hinged at the rear to the frame of the motor vehicle so that it can rotate about a first horizontal axis between the open position and the closed position. The element of covering is made up of two half-elements, which are connected together in such a way that one half-element of front covering is folded on a half-element of rear covering when the folding top passes from the closed position to the open position.

13 Claims, 14 Drawing Sheets

U.S. PATENT DOCUMENTS

| | | | | |
|---|---|---|---|---|
| 8,296,295 | * | 10/2001 | Jambor et al. | 296/146.14 |
| 6,347,827 B1 | * | 2/2002 | Maass | 296/107.09 |
| 6,431,637 B2 | * | 8/2002 | Maass | 296/146.14 |
| 6,557,921 B2 | * | 5/2003 | Wazyk et al. | 296/107.07 |
| 6,832,805 B2 | * | 12/2004 | Quindt et al. | 296/107.08 |
| 7,017,972 B2 | * | 3/2006 | Rudolph et al. | 296/107.16 |
| 7,021,695 B2 | * | 4/2006 | Quindt et al. | 296/107.12 |
| 7,334,831 B2 | * | 2/2008 | Wezyk et al. | 296/107.09 |
| 7,621,583 B2 | * | 11/2009 | Fallis et al. | 296/108 |

FOREIGN PATENT DOCUMENTS

| | | |
|---|---|---|
| DE | 9411974 | 11/1996 |
| DE | 10130267 | 1/2003 |
| DE | 20214460 | 3/2004 |
| DE | 10259864 | 7/2004 |
| EP | 1260394 | 11/2002 |
| EP | 1260394 A2 * | 11/2002 |

* cited by examiner

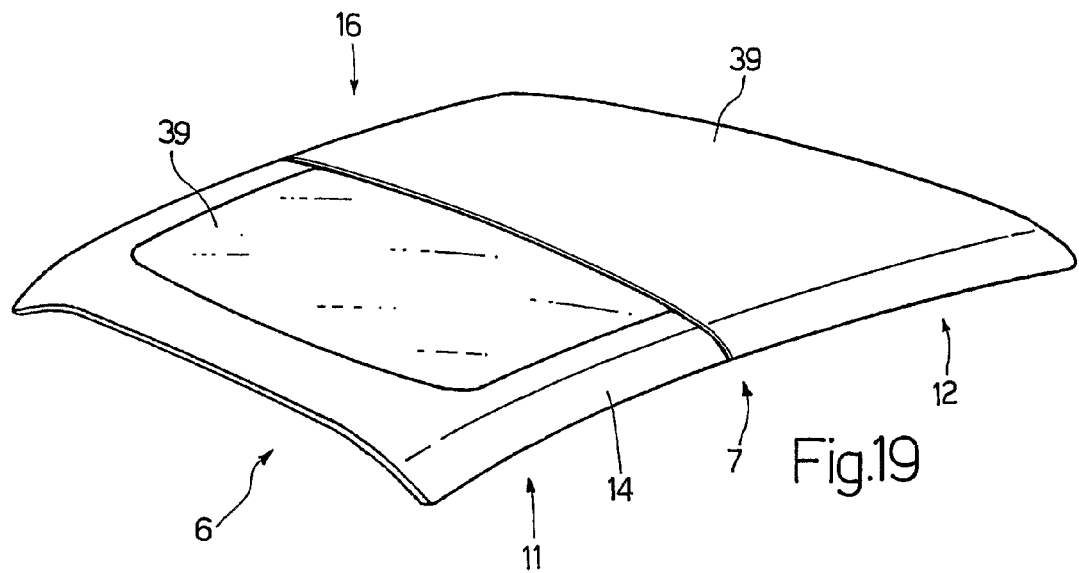
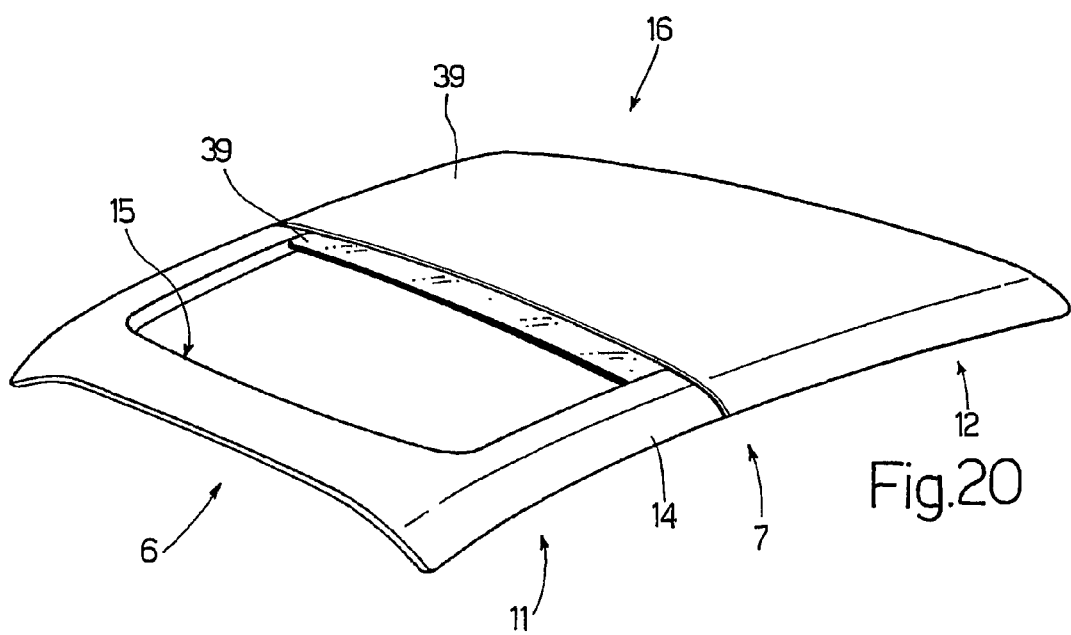

MOTOR VEHICLE PROVIDED WITH A FOLDING TOP

TECHNICAL FIELD

The present invention relates to a motor vehicle provided with a folding top.

BACKGROUND ART

There have always been present on the automobile market motor vehicles equipped with folding tops that can be unfolded to assume a closed position, in which the folding top covers the entire passenger compartment of the motor vehicle to enable use of the motor vehicle in the case of bad weather and/or cold, and can be folded to assume an open position, in which substantially the entire passenger compartment of the motor vehicle is uncovered. In the past, folding tops of the type described above had always been made of canvas, which is folded on itself in bellows fashion when the folding top assumes the open position. A folding top made of canvas is simple and inexpensive to produce, but also presents various drawbacks, in so far as the canvas tends to age quite rapidly above all when it is exposed to inclement weather conditions and to sunlight, and hence frequently the useful life of a folding top made of canvas is relatively short. Furthermore, canvas does not afford a good acoustic insulation, and hence the passenger compartment is particularly noisy also when the folding top is in the closed position. In addition, canvas tends to get deformed and to vibrate in a noisy way when the motor vehicle travels at relatively high speeds. Finally, canvas does not provide sufficient security in so far as it can easily be cut just with a knife by an ill-intentioned person who wishes to gain access to the inside of the motor vehicle.

For the reasons set forth above, there have recently been proposed motor vehicles provided with a rigid folding top made of sheet metal, said folding top normally being made up of two or more rigid elements made of sheet metal hinged together and designed to fold onto one another to pass from the closed position to the open position. In particular, one element defines a roof of the passenger compartment and delimits the passenger compartment at the top, whilst the other element defines a rear window and delimits the passenger compartment at the rear. However, a rigid folding top of the type described above presents some drawbacks in so far as, in the folded position, it presents large overall dimensions that may prove incompatible with the characteristics of some types of vehicles and particularly with vehicles having the engine housed in a central or rear position.

DISCLOSURE OF INVENTION

The purpose of the present invention is to provide a motor vehicle equipped with a folding top, which will be easy and inexpensive to produce and will, at the same time, be free from the drawbacks described above.

In accordance with the present invention, a motor vehicle is provided equipped with a folding top as specified in claim 1 and, preferably, in any one of the subsequent claims depending directly or indirectly upon claim 1.

BRIEF DESCRIPTION OF THE DRAWINGS

The present invention will now be described with reference to the annexed drawings, which illustrate some non-limiting examples of embodiment thereof, in which:

FIGS. 19 and 20 are schematic illustrations, and with removal of some parts for reasons of clarity, of the perspective views of an additional embodiment of the folding top of the motor vehicle of FIG. 1 during successive steps of opening.

BEST MODE FOR CARRYING OUT THE INVENTION

Figure 1:
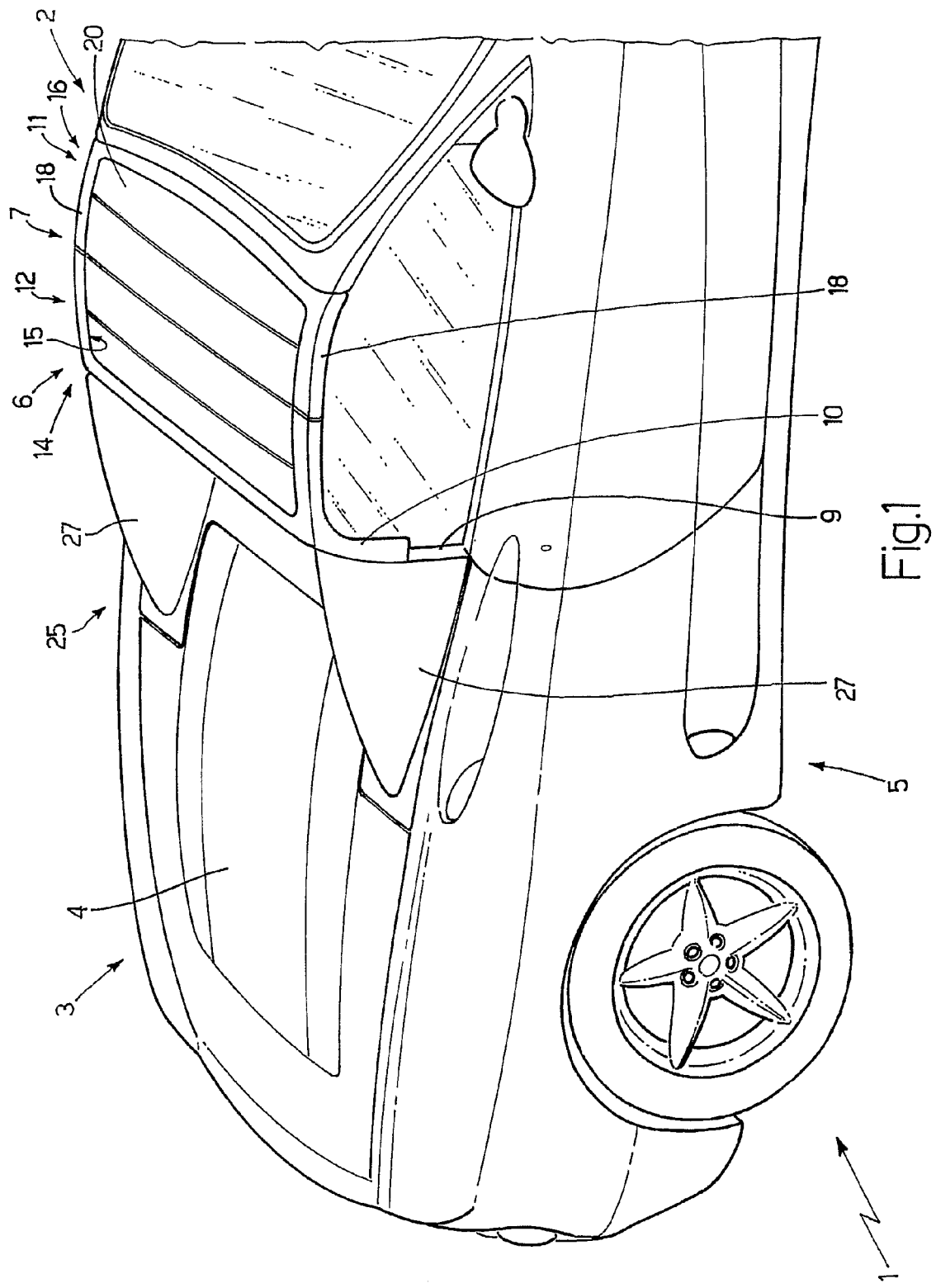
FIG. 1 illustrates a perspective and schematic view of a motor vehicle produced according to the teachings of the present invention and equipped with a folding top set in a closed position.

In FIG. 1, designated by the reference number 1 is a motor vehicle having a passenger compartment 2 and an engine compartment 3, which is set in a central position behind the passenger compartment 2 and is closed by a top transparent lid 4. A frame 5 of the motor vehicle 1 supports a folding top 6, which can be set in an open position (illustrated in FIG. 6), in which the passenger compartment 2 is completely uncovered, or in a closed position (illustrated in FIG. 1), in which the entire passenger compartment 2 is covered by the folding top 6 itself.

The folding top 6 comprises a covering element 7, which is substantially horizontal in the closed position and is hinged at the rear to the frame 5 so that it can rotate about a horizontal axis 8 (illustrated in FIG. 4) between the open position and the closed position. The frame 5 comprises a pair of vertical uprights 9, which are set on opposite sides of the passenger compartment 2, carry hinged thereto the covering element 7, and perform the function of roll-bar in the case of turning-over of the motor vehicle 1. The covering element 7 is substantially plane and has at the rear two appendages 10, which are set perpendicular to the covering element 7, are substantially vertical in the closed position, and are hinged to the uprights 9 of the frame 5 in a position corresponding to their free ends.

Figure 3:
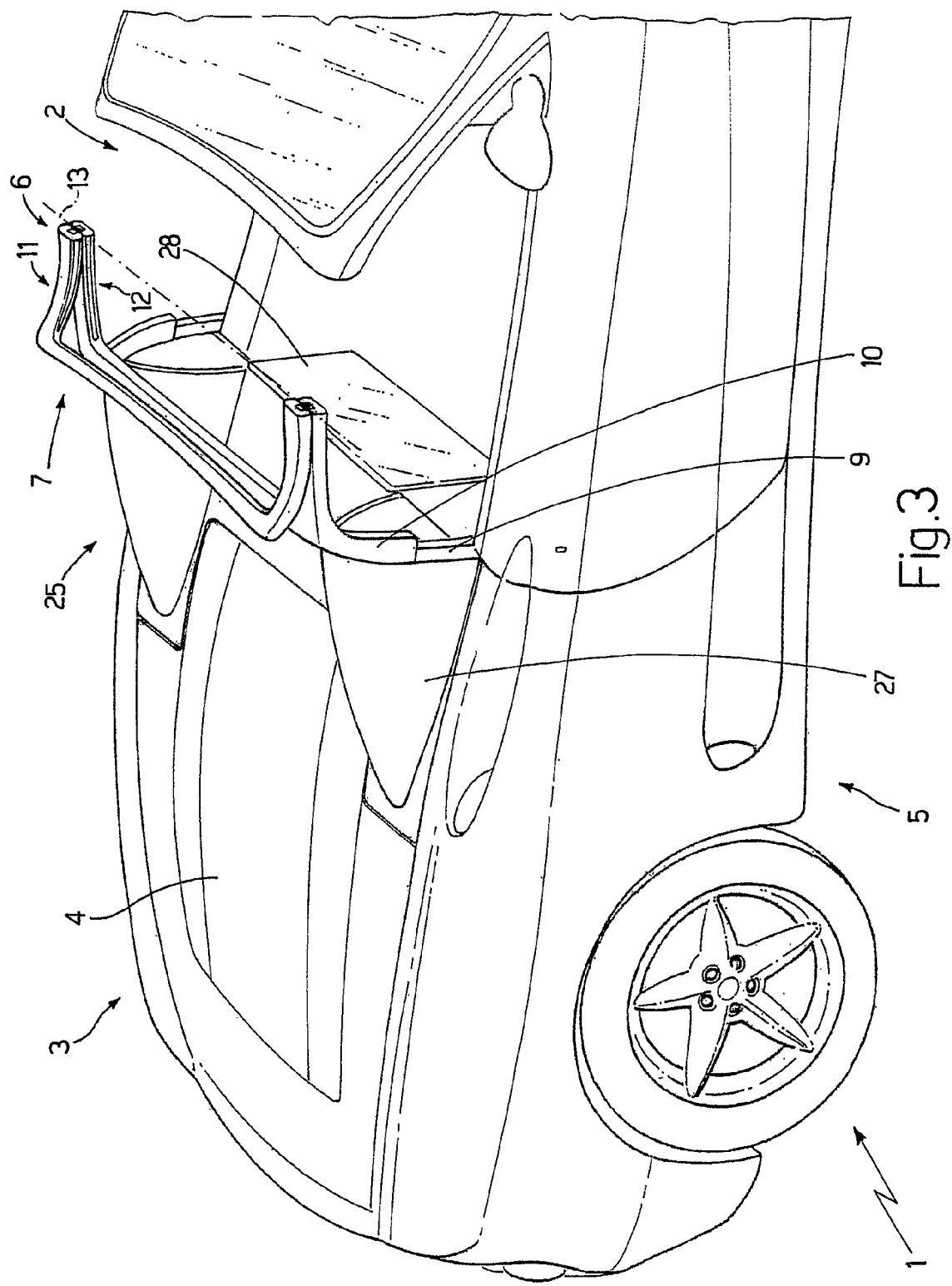

The covering element 7 is made up of a half-element 11 of front covering and by a half-element 12 of rear covering, which are hinged together so as to rotate with respect to one another about a horizontal axis 13 (illustrated in FIG. 4) parallel to the axis 8 in such a way that the half-element 11 of front covering is folded on the half-element 12 of rear covering when the folding top 6 passes from the closed position to the open position (as illustrated in greater detail in FIG. 3).

Furthermore, the covering element 7 comprises a rigid outer frame 14, a hollow central portion 15 surrounded by the outer frame 14, and a closing body 16, which is supported by the outer frame 14 and is mobile between a position of engagement, in which it completely closes the central portion 15, and a position of disengagement, in which it leaves open at least one part of the central portion 15. Preferably, the outer frame 14 surrounds completely on all four sides the central portion 15. According to a different embodiment (not illustrated), the outer frame 14 could surround the central portion 15 only on three sides, leaving substantially free the front side set in a position corresponding to the windscreen when the folding top 6 is in the closed position. It should be emphasized that the closing body 16 is not illustrated for reasons of clarity in FIGS. 3-5.

Figure 7:
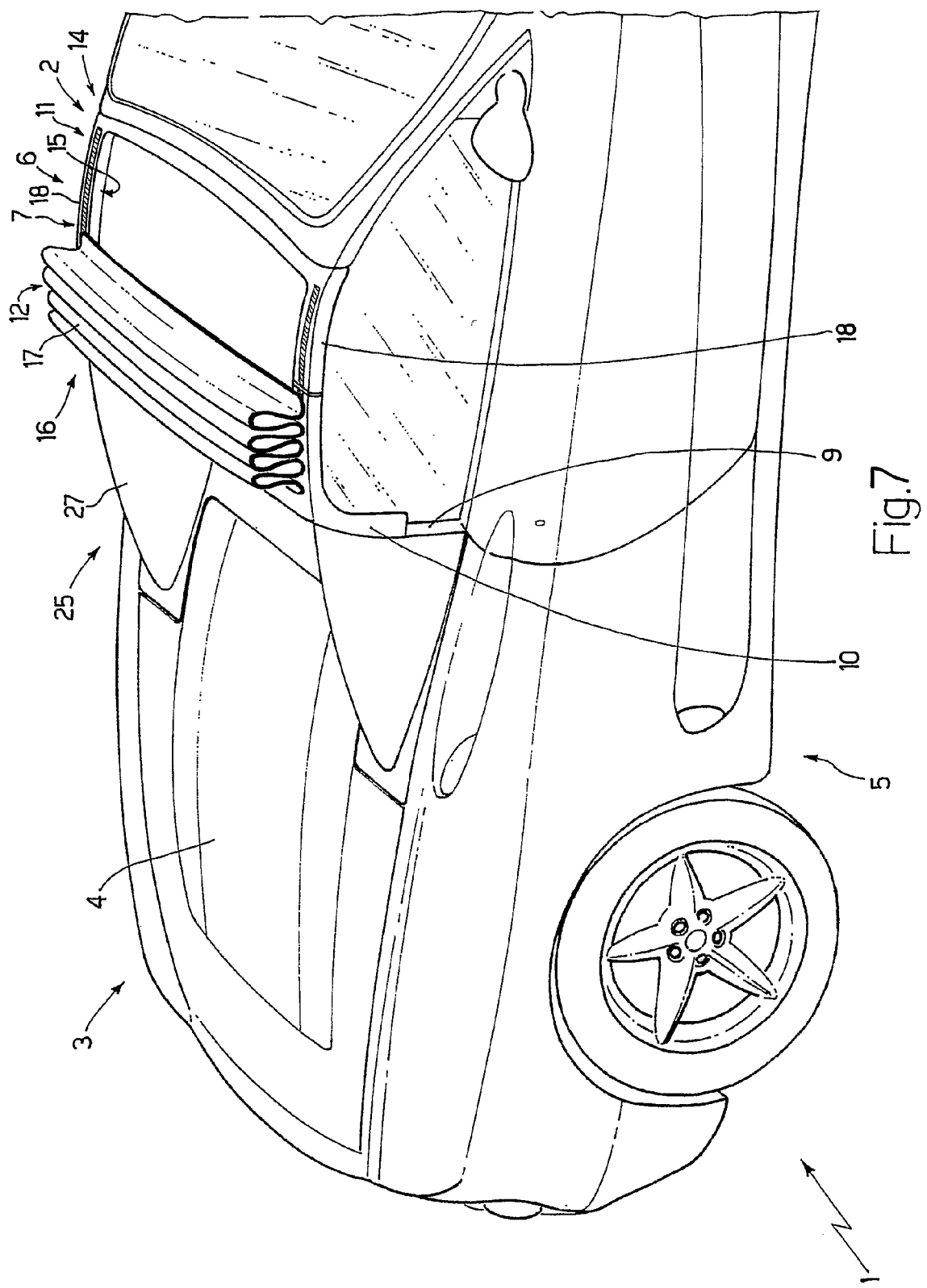
FIG. 7 illustrates a perspective view of a different embodiment of the motor vehicle of FIG. 1, with the folding top set in a partially closed position.
Figure 8:
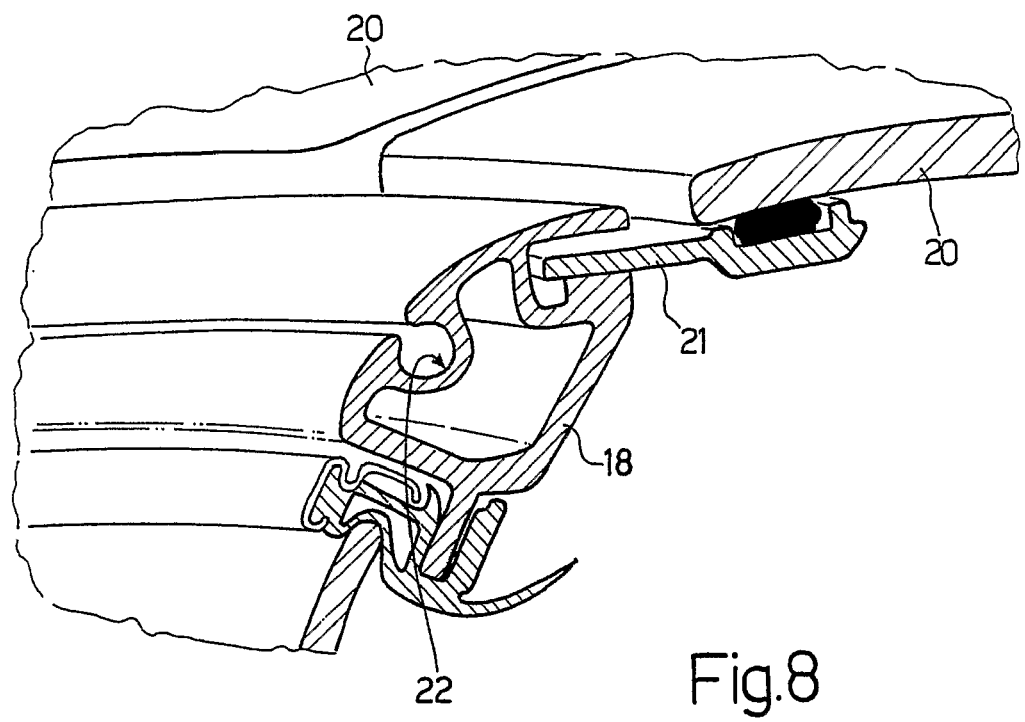
FIG. 8 illustrates a perspective view, sectioned and at an enlarged scale, of a side member of the folding top of the motor vehicle of FIG. 1.
Figure 9:
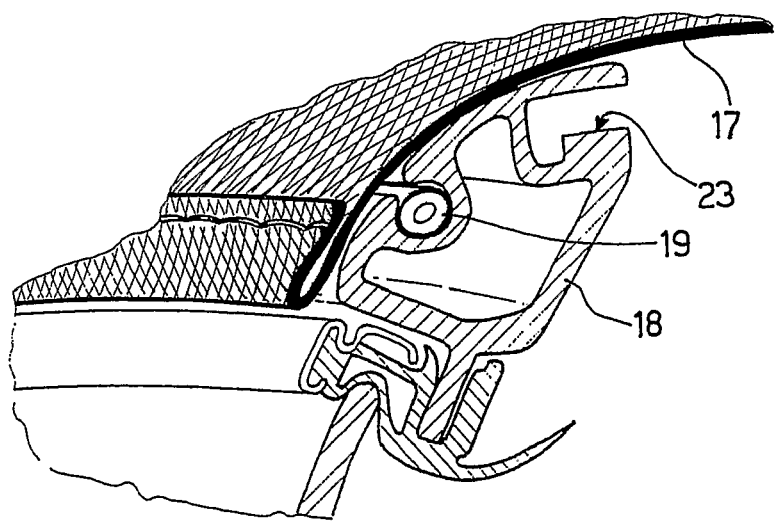
FIG. 9 illustrates a perspective view, sectioned and at an enlarged scale, of a side member of the folding top of the motor vehicle of FIG. 7.
Figure 10:
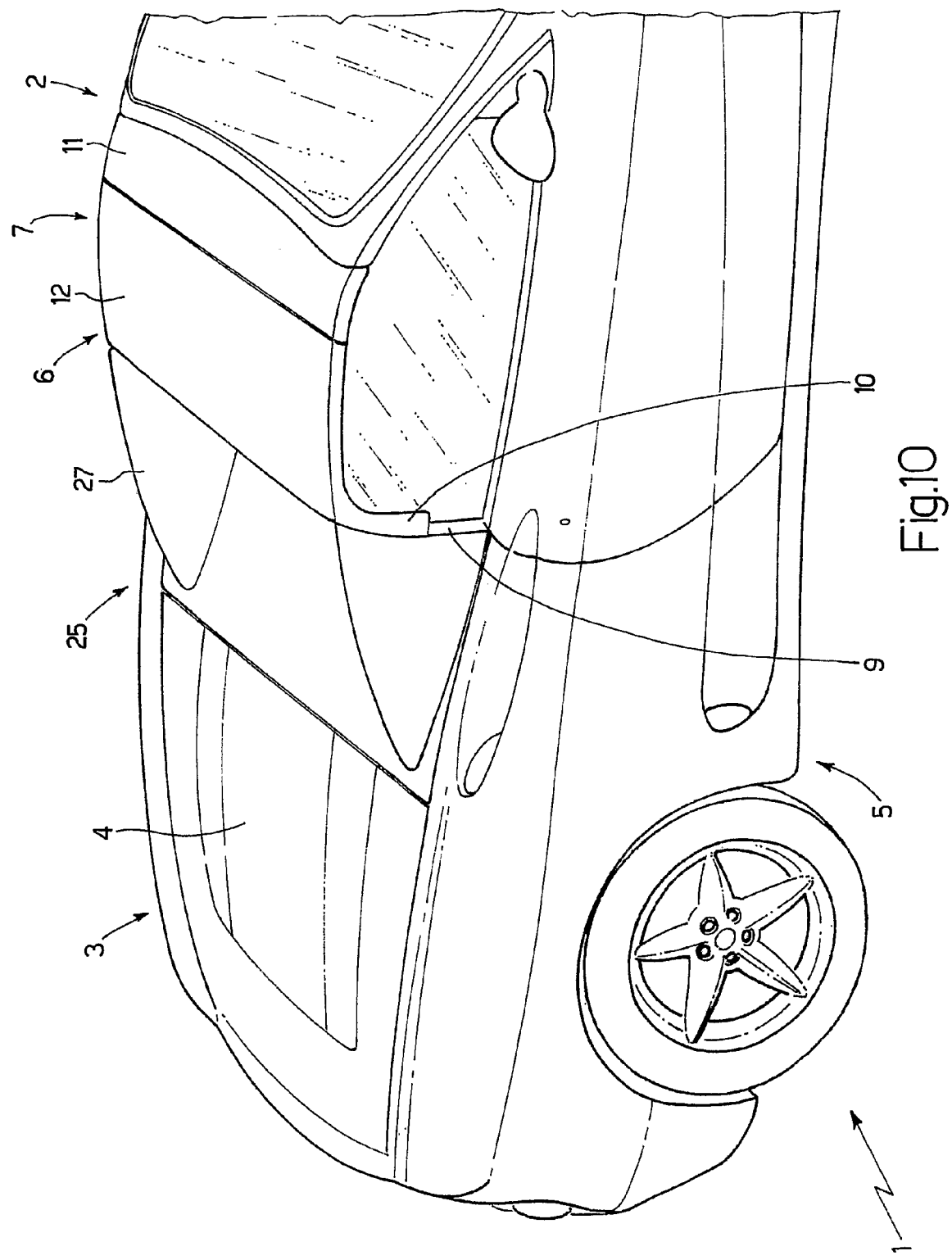
FIG. 10 illustrates a perspective and schematic view of a different embodiment of a motor vehicle obtained according to the teachings of the present invention and provided with a folding top set in a closed position.
Figure 11:
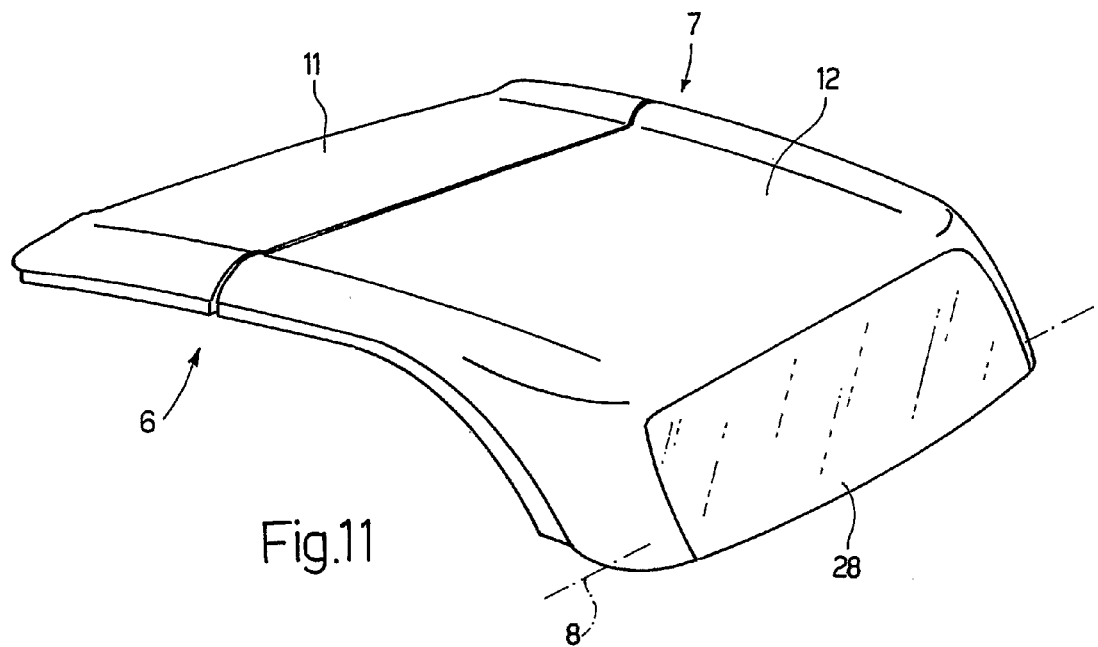
FIGS. 11-14 are schematic illustrations, and with removal of some parts for reasons of clarity, of the perspective views of the folding top of the motor vehicle of FIG. 10 during successive steps of opening.
Figure 12:
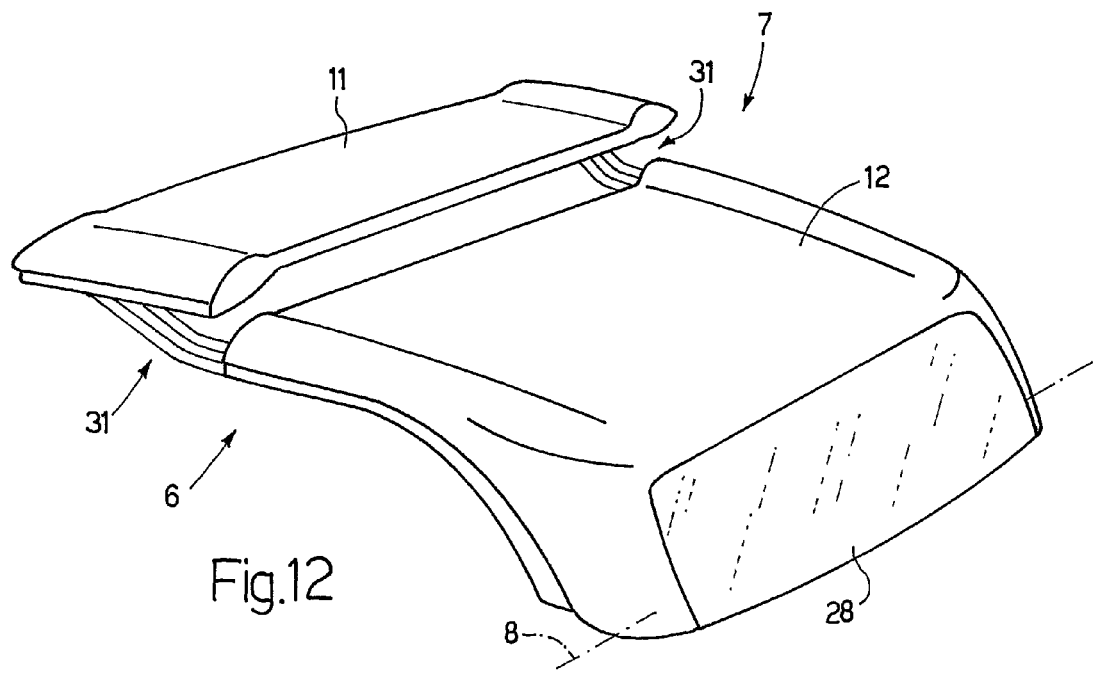
Figure 13:
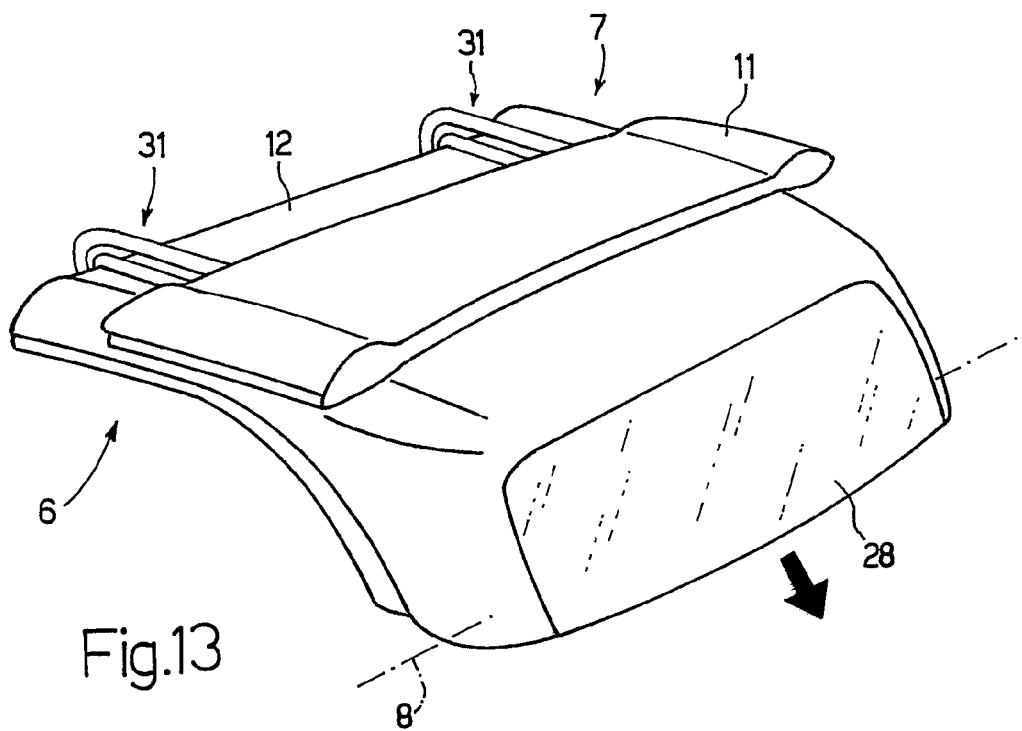
Figure 14:
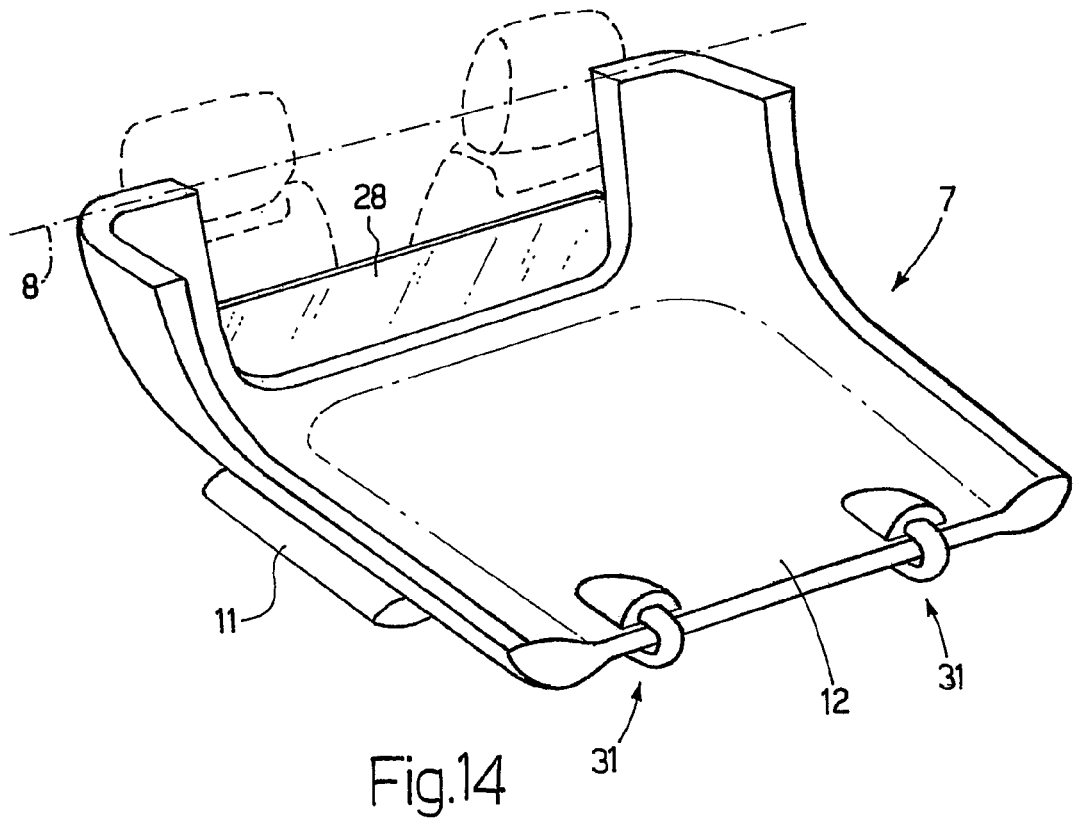

The closing body 16 is deformable so as to pass from a distended configuration corresponding to the position of engagement to a gathered-up configuration corresponding to the position of disengagement. According to what is illustrated in FIG. 7, the closing body 16 can comprise a flexible canvas 17, which is slidably mounted on two side members 18 (illustrated in greater detail in FIGS. 8 and 9) of the outer frame 14 to slide between the position of engagement and the position of disengagement. In this case, the canvas 17 is mounted on slides 19, each of which is slidably mounted along a respective side member 18 of the outer frame 14.

Figure 2:
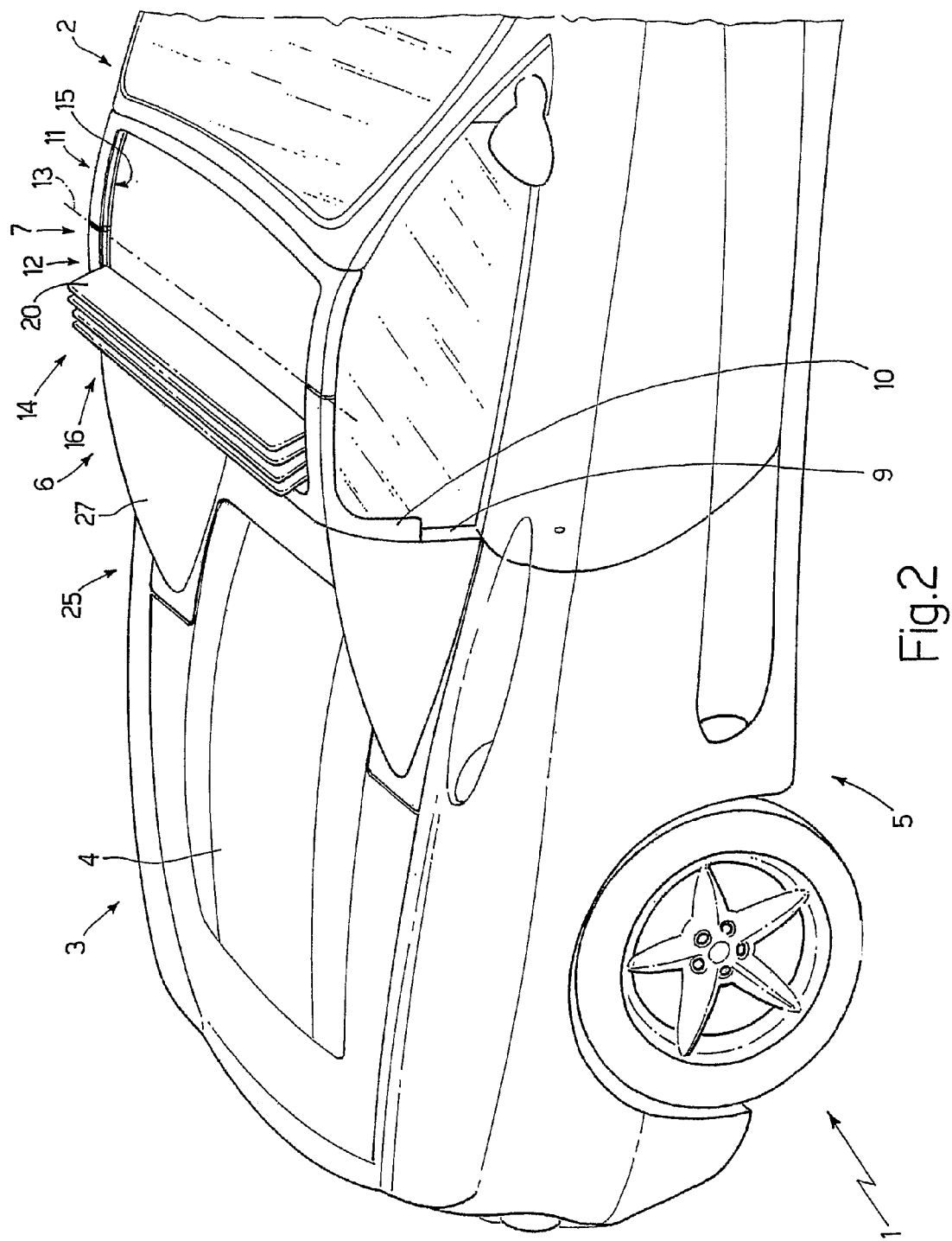
FIGS. 2-5 illustrate some perspective views of the motor vehicle of FIG. 1 during successive steps of opening of the folding top and with the removal of some parts for reasons of clarity.

Alternatively, according to what is illustrated in FIGS. 1 and 2 the closing body 16 is of a plate-like type and comprises a set of rigid plates 20, which are hinged in a slidable way on the two side members 18 of the outer frame 14 to slide between the position of engagement, in which the plates 20 are set horizontally alongside one another, and the position of disengagement, in which the plates 20 are set vertically packed on top of one another. In this case, each plate 20 is mounted on a pair of slides 21, each of which is slidably mounted along a respective side member 18 of the outer frame 14.

Preferably, each side member 18 comprises both a first seat 22, designed to be engaged by a number of slides 19 supporting the flexible canvas 17, and a seat 23, designed to be engaged by a number of slides 21 supporting a set of rigid plates 20. In this way, the steps of construction of the folding top 6 are simplified in so far as the differences existing between the version with the canvas 17 and the version with the plates 20 are decidedly reduced. Furthermore, it is possible to modify, with relatively contained costs, a motor vehicle 1 used to pass from the version with canvas 17 to the version with the plates 20, or vice versa.

At the rear of the point of hinging of the covering element 7 there is provided a housing 24, which is supported by the frame 5 and is closed by a respective lid 25 that is hinged so as to rotate with respect to the frame 5 about a horizontal axis 26 (illustrated in FIG. 4) parallel to the axis 8. Preferably, the housing 24 is C-shaped set around the top lid 4 of the engine compartment 3. Moreover, the lid 25 of the housing 24 comprises two vertical fins 27 set laterally on opposite sides of the lid 25, designed to rest on the vertical uprights 9 of the frame 5 when the lid 25 is in a closed position, and designed to contain the appendages 10 of the covering element 7 when the folding top 6 is in the open position.

Finally, there is provided a plane transparent panel 28, which is set substantially vertical (or with an appropriate inclination so as not to generate troublesome reflections on the rear-view mirror inside the motor vehicle 1) and defines a rear window of the passenger compartment 2. In particular, the panel 28 is made of glass with one or more layers and is supported by a frame made of metal or other material, which is mounted on two vertical side guides (not illustrated in detail) for its displacement parallel to itself between an extracted position, in which the transparent panel 28 comes out of the bodywork, and a retracted position, in which the transparent panel 28 is housed inside the bodywork in a respective seat (not illustrated in detail).

Figure 5:
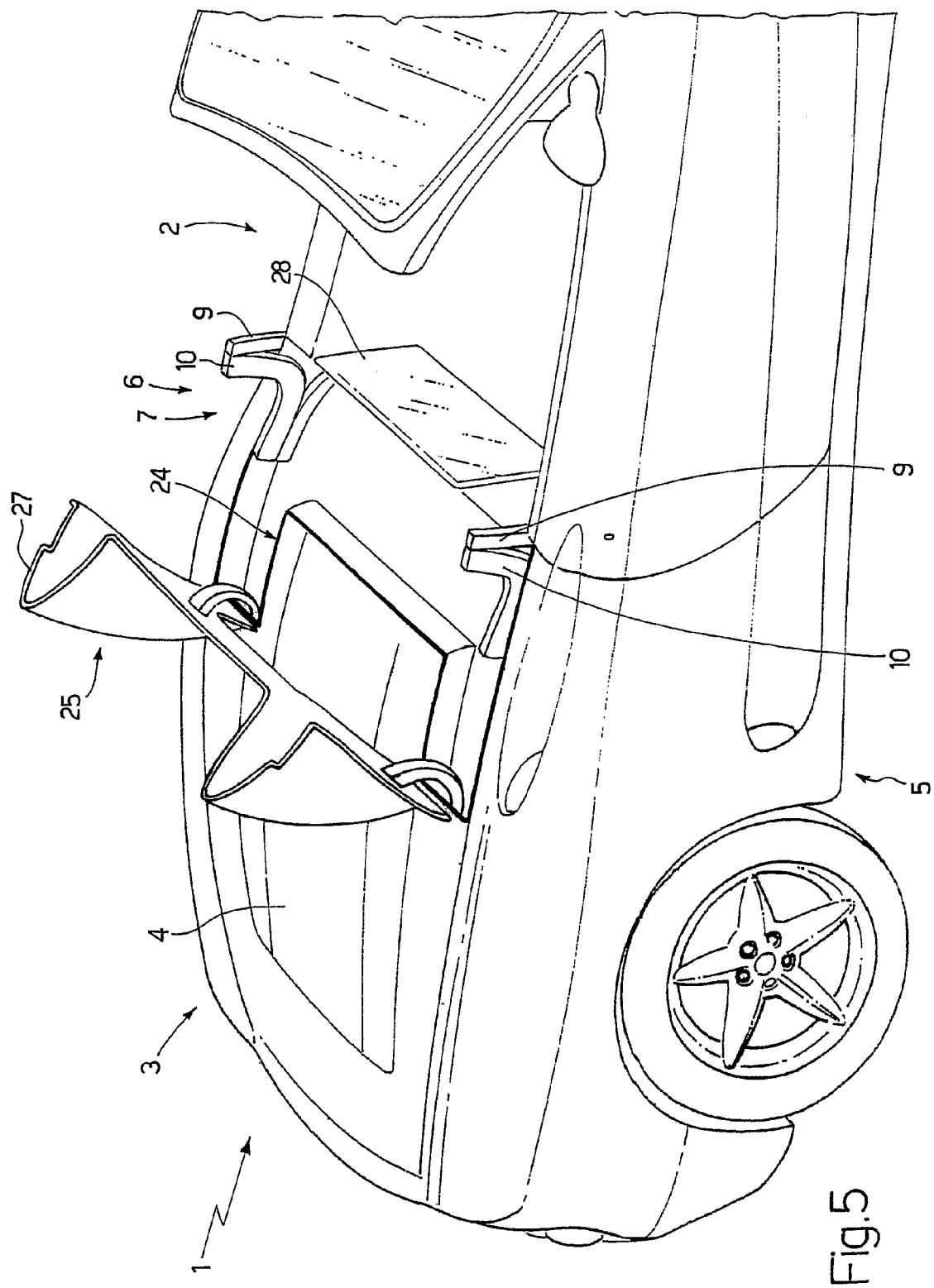
Figure 6:
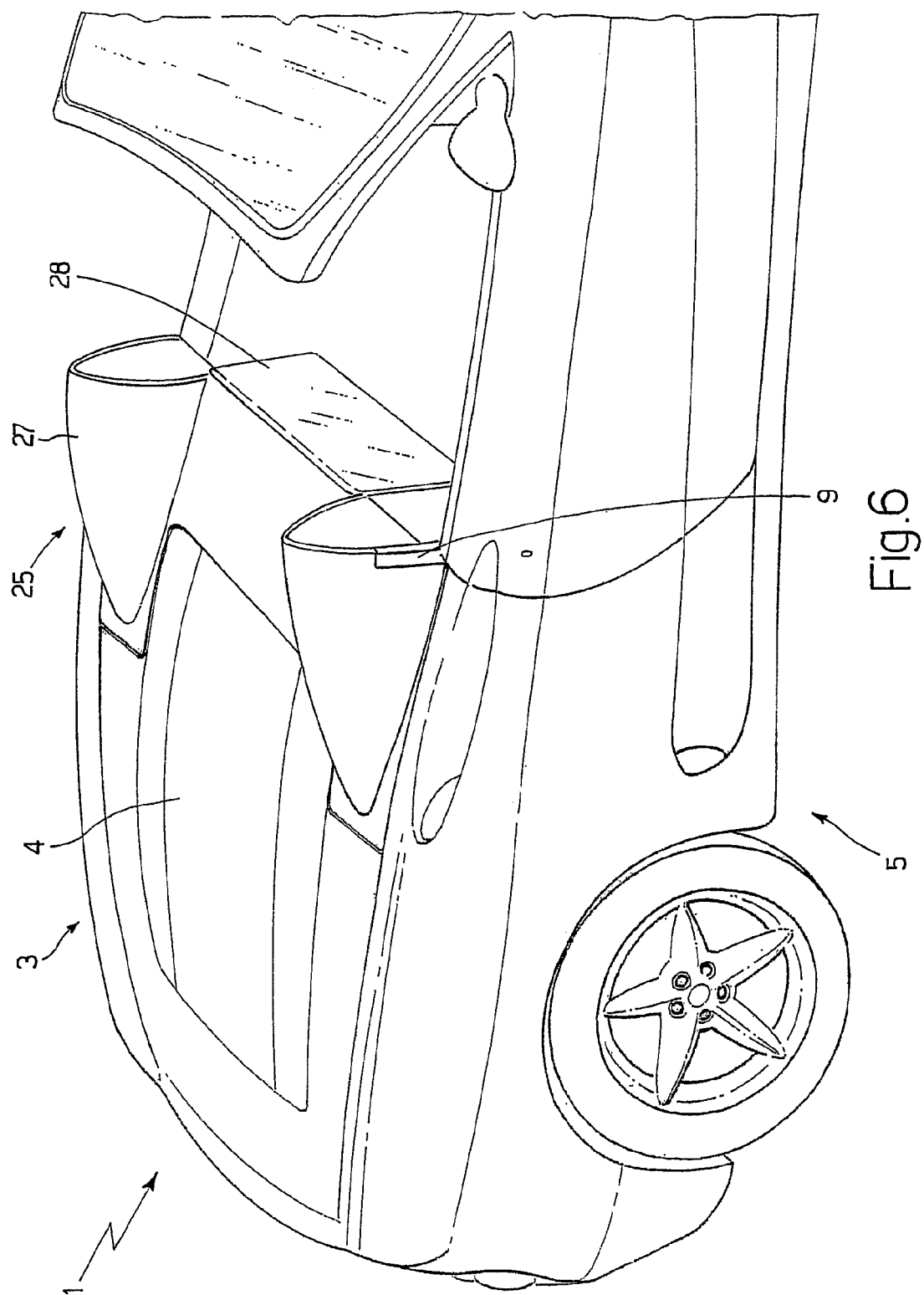
FIG. 6 illustrates a perspective view of the motor vehicle of FIG. 1 with the folding top set in an open position.

FIG. 1 illustrates the folding top 6 set in the closed position, and FIG. 6 illustrates the folding top 6 set in the open position. FIGS. 2-5 illustrate the steps performed by the folding top 6 to pass from the closed position to the open position.

Initially, the closing body 16 is displaced from the position of engagement (FIG. 1), in which it completely closes the central portion 15, to the position of disengagement (FIGS. 2 and 7), in which it leaves open a part of the central portion 15. Subsequently, the half-element 11 of front covering is rotated through approximately 180° about the axis 13 and with respect to the half-element 12 of rear covering so as to be set folded on the half-element 12 of rear covering itself (FIG. 3).

Figure 4:
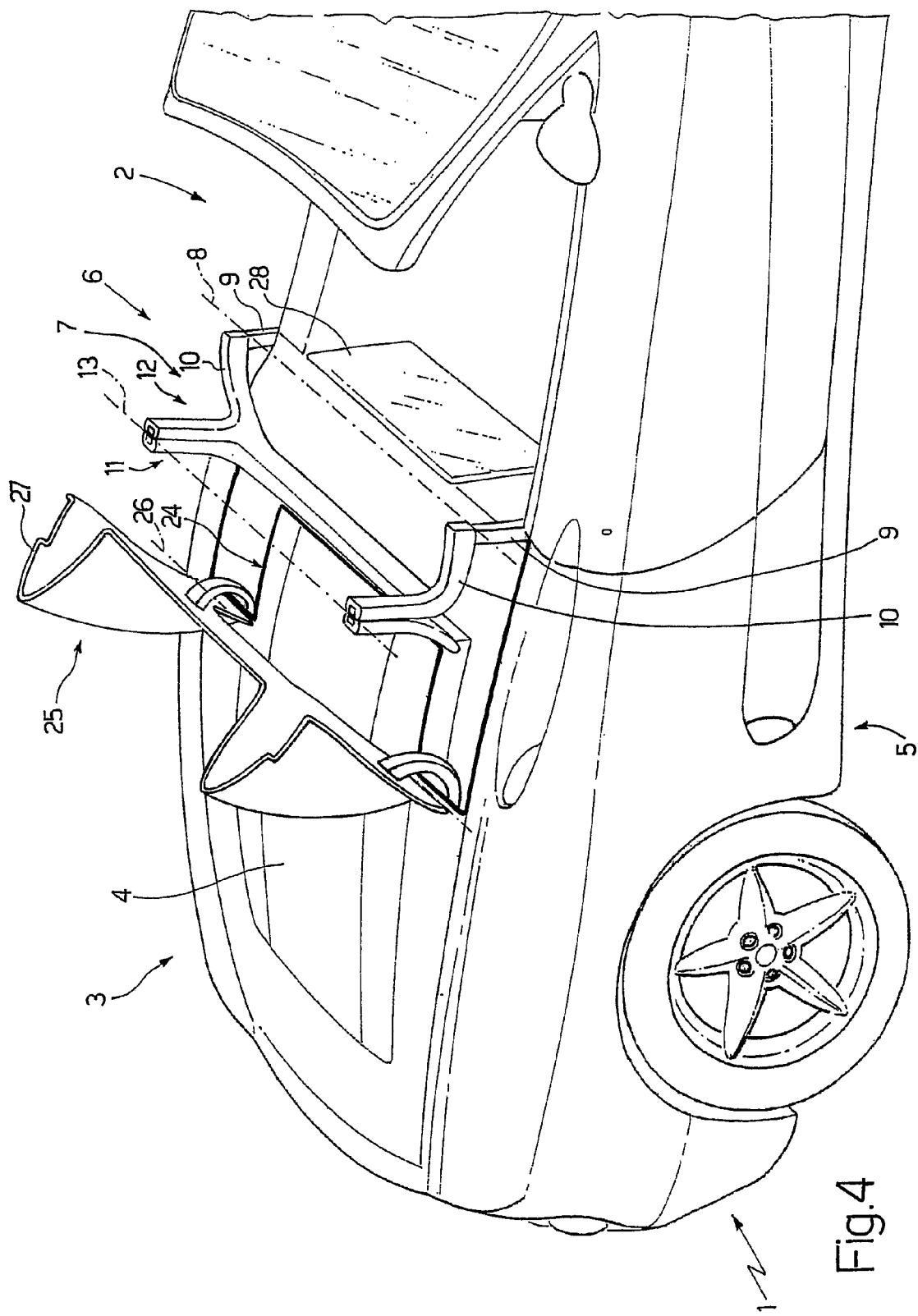

At this point, the lid 25 of the housing 24 is open so as to enable the covering element 7 to rotate through approximately 180° about the axis 8 and be set then within the housing 24 itself (FIGS. 4 and 5). Finally, the lid 25 of the housing 24 is closed (FIG. 6).

It should be noted that during the operations of opening or closing of the folding top 6, the transparent panel 28 is kept in the retracted position, in which the transparent panel 28 is housed inside the bodywork to prevent interference with the movement of rotation of the covering element 7 about the axis 8. When the folding top 6 is in the open position illustrated in FIG. 6, the transparent panel 28 can be set indifferently in the extracted position (in which it performs the function of windbreak) or in the retracted position according to the preference of the driver of the motor vehicle 1.

All of the movements described above are preferably obtained with the aid of electrical, pneumatic or hydraulic actuators. In any case, the choice may be adopted to cause some or all of the movements to be performed manually by the driver of the motor vehicle 1.

In the attached figures, the horizontal axes 8 and 13 are fixed axes of rotation, i.e., they do not undergo any translation in space. However, according to a different embodiment (not illustrated) the axis 8 and/or the axis 13 are mobile axes, i.e., in use they displace parallel to themselves and are obtained by means of a kinematic mechanism that brings about a displacement in space.

According to an alternative embodiment (not illustrated), the covering element 7 is without the hollow central portion 15. Obviously, in this case also the shape of the housing 24 must be modified accordingly. According to a further embodiment (not illustrated), the covering element 7 is a single rigid body and does not have the two half-elements 11 and 12 hinged together.

It should be noted that the closing body 16 can at any moment be displaced from the position of engagement (FIG. 1), in which it completely closes the central portion 15, to the position of disengagement (FIGS. 2 and 7), in which it leaves open a part of the central portion 15, even without proceeding further to the complete opening of the folding top 6. In this way, the passenger compartment 2 is only partially uncovered (instead of being completely uncovered, as occurs when the folding top 6 is in the position of complete opening), and thus it is more sheltered from the draughts generated by the speed of advance of the motor vehicle 1.

FIGS. 10-15 illustrate a different embodiment of the covering element 7 of the folding top 6. In particular, the half-element 11 of front covering is not hinged to the half-element 12 of rear covering as illustrated in FIGS. 1-9, but is mounted on the half-element 12 of rear covering so as to translate parallel to itself with respect to the half-element 12 of rear covering. In other words, as illustrated in the sequence represented in FIGS. 11-14, when the folding top 6 passes from the closed position to the open position, the half-element 11 of front covering is folded on the half-element 12 of rear covering not by means of a rotation about the axis 13, but by means of a translation or a rototranslation of the half-element 11 of front covering with respect to the half-element 12 of rear covering.

According to the embodiment illustrated in FIGS. 1-9, when the half-element 11 of front covering is folded on the half-element 12 of rear covering, a top surface of the half-element 11 of front covering rests on a top surface of the half-element 12 of rear covering. Instead, according to the embodiment illustrated in FIGS. 10-15, when the half-element 11 of front covering is set on the half-element 12 of rear covering, a bottom surface of the half-element 11 of front covering rests on a top surface of the half-element 12 of rear covering. According to further embodiments (not illustrated), when the half-element 11 of front covering is folded on the half-element 12 of rear covering, a bottom surface of the half-element 11 of front covering rests on a bottom surface of the half-element 12 of rear covering, or else a top surface of the half-element 11 of front covering rests on a bottom surface of the half-element 12 of rear covering.

Once the half-element 11 of front covering is folded on the half-element 12 of rear covering by means of a translation of the half-element 11 of front covering with respect to the half-element 12 of rear covering, the transparent panel 28 is carried into the aforesaid retracted position, and the covering element 7 rotates about the axis 8 to be set within the housing 24, as was described previously for the embodiment illustrated in FIGS. 1-9.

Figure 15:
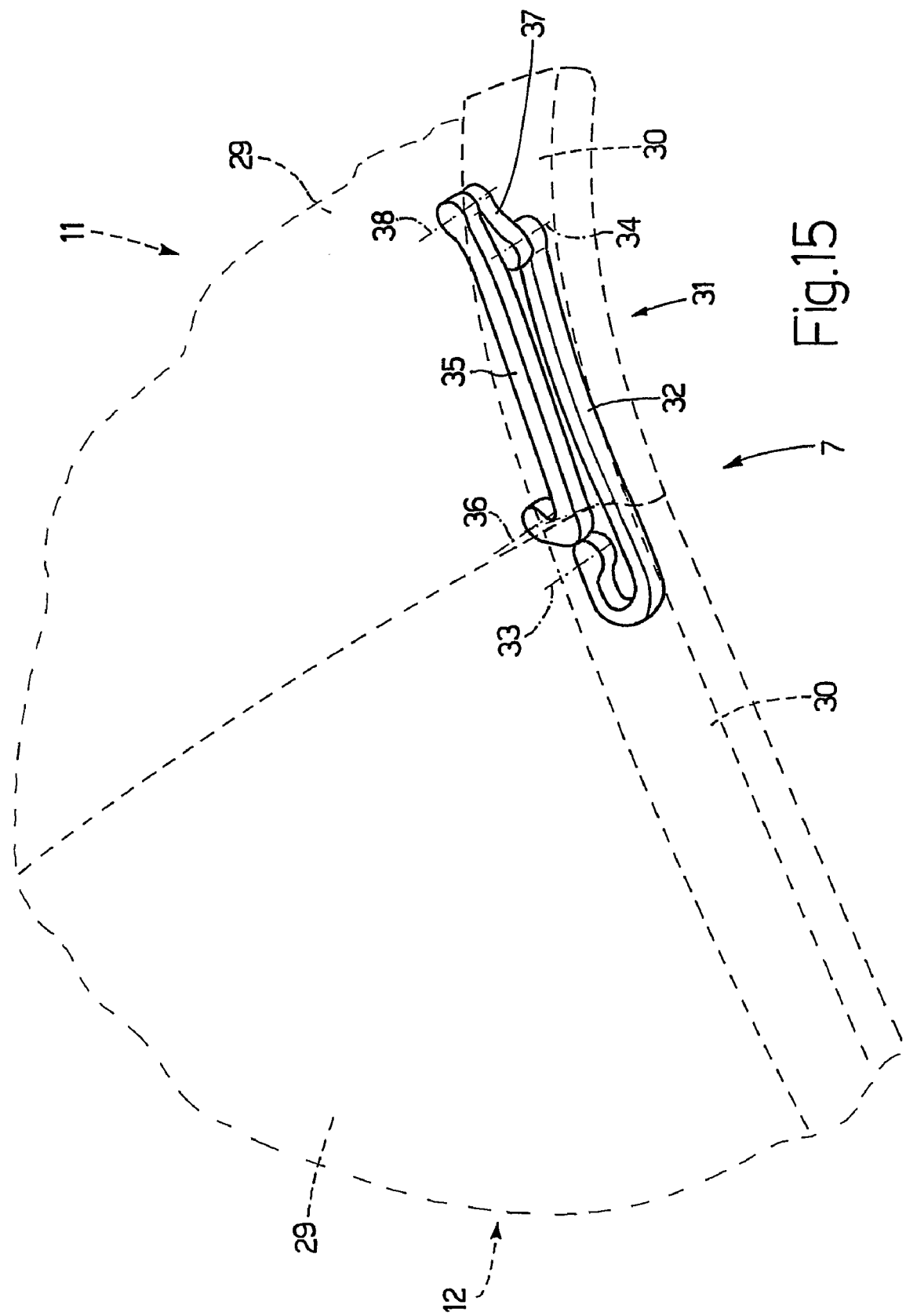
FIG. 15 is a schematic illustration of a detail of the folding top of the motor vehicle of FIG. 10.

FIG. 15 illustrates in detail the mechanical connection existing between the half-element 11 of front covering and the half-element 12 of rear covering. In particular, the half-elements 11 and 12 of covering comprise a substantially horizontal central portion 29 delimited laterally by a pair of substantially vertical side portions 30. The half-element 11 of front covering is connected to the half-element 12 of rear covering by means of a pair of deformable quadrilaterals 31, each of which comprises a hook-shaped arm 32, which has one end hinged to the side portion 30 of the half-element 12 of rear covering so that it can rotate about a substantially horizontal axis 33 and one opposite end hinged to the side portion 30 of the half-element 11 of front covering so that it can rotate about a substantially horizontal axis 34. The deformable quadrilateral 31 further comprises an L-shaped arm 35, which has one end hinged to the side portion 30 of the half-element 12 of rear covering so that it can rotate about a substantially horizontal axis 36 and one opposite end hinged to the end of a further arm 37 so that it can rotate about a substantially horizontal axis 38. At the other end, the arm 37 is hinged both to the hook-shaped arm 32 and the side portion 30 of the half-element 11 of front covering so that it can rotate about the axis 34.

In the embodiment illustrated in FIGS. 10-15, the central portion 15 of the covering element 7 is solid. According to a different embodiment (not illustrated), the central portion 15 of the covering element 7 is hollow and can be closed by the closing body 16.

Figure 16:
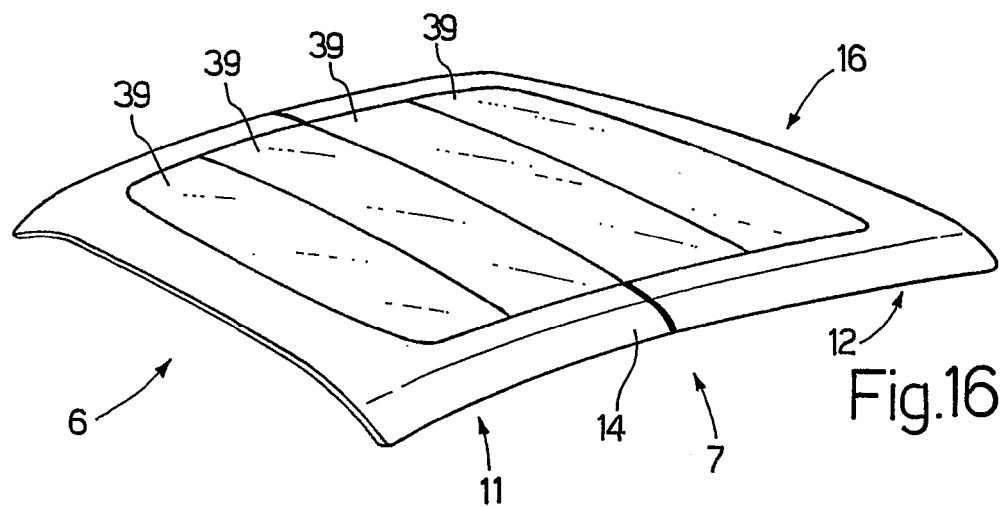
FIG. 16-18 are schematic illustrations, and with removal of some parts for reasons of clarity, of the perspective views of a further embodiment of the folding top of the motor vehicle of FIG. 1 during successive steps of opening.
Figure 17:
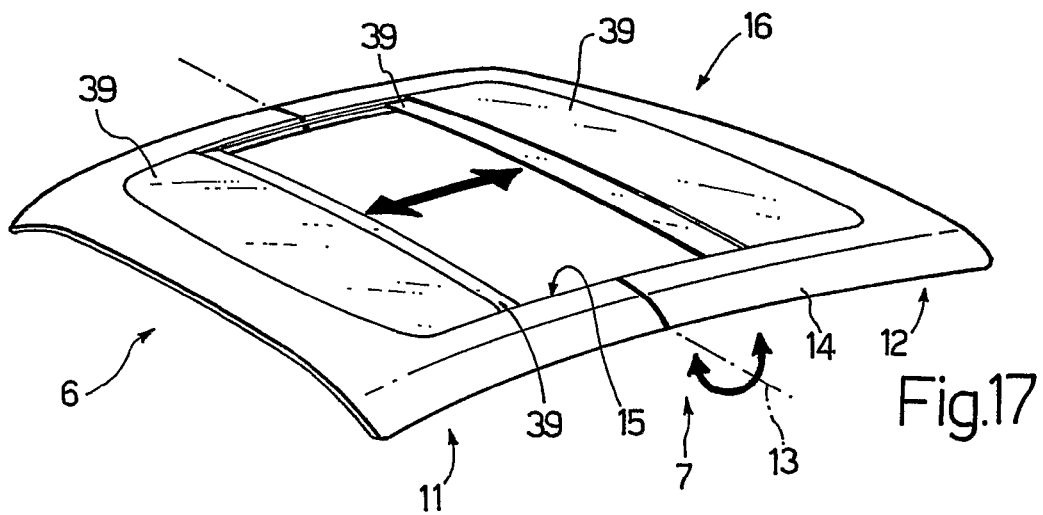
Figure 18:
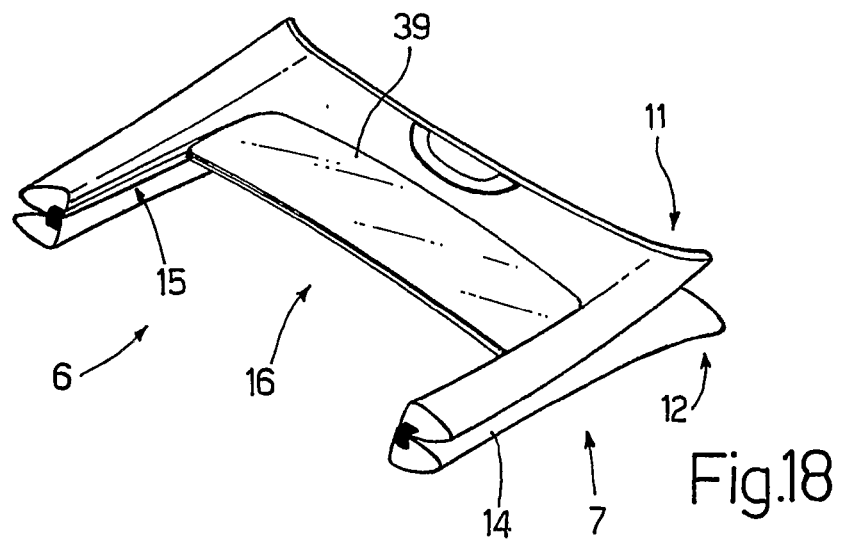

FIGS. 16-18 illustrate a different embodiment of the covering element 7 of the folding top 6. The embodiment of FIGS. 16-18 is substantially similar to the embodiment illustrated in FIGS. 1-6, and differs from the embodiment illustrated in FIGS. 1-6 in the modality of formation of the closing body 16, which is mobile between a position of engagement, in which it completely closes the central portion 15 of the covering element 7, and a position of disengagement, in which it leaves open at least one part of the central portion 15.

According to what is illustrated in FIGS. 16-18, the covering element 7 is substantially horizontal in the closed position and is hinged at the rear to the frame 5 so that it can rotate about a horizontal axis 8 (illustrated in FIG. 4) between the open position and the closed position. Furthermore, the covering element 7 is made up of the half-element 11 of front covering and of the half-element 12 of rear covering, which are hinged together so as to rotate with respect to one another about the horizontal axis 13 (illustrated in FIG. 17) parallel to the axis 8 in such a way that the half-element 11 of front covering is folded on the half-element 12 of rear covering when the folding top 6 passes from the closed position to the open position (as illustrated in greater detail in FIG. 18).

Furthermore, the covering element 7 comprises the rigid outer frame 14, the hollow central portion 15 surrounded by the outer frame 14, and the closing body 16, which is supported by the outer frame 14 and is mobile between a position of engagement, in which it completely closes the central portion 15 (as illustrated in FIG. 16), and a position of disengagement, in which it leaves open at least one part of the central portion 15 (as illustrated in FIG. 17).

According to what is illustrated in FIGS. 16-18, the closing body 16 is substantially of a plate-like type and comprises four rigid panels 39. The two front and rear panels 39 are mounted in a fixed position on the outer frame 14, whilst the two central panels 39 are slidably mounted on the outer frame 14. For example, the two central panels 39 can be mounted on respective pairs of slides, each of which is slidably mounted along a respective side member of the outer frame 14. In this way, the two mobile central panels 39 can slide with respect to the outer frame 14 and with respect to the fixed panels 39 between the position of engagement, in which all the panels 39 are set horizontally alongside one another, and the position of disengagement, in which the two mobile central panels 39 are set underneath the two fixed panels 39. In other words, each mobile central panel 39 can slide underneath (or possibly on top of) a respective panel 39 fixed so as to open the respective part of the central portion 15.

According to a different embodiment (illustrated in FIGS. 19 and 20), is provided a single fixed rear panel 39 and a single mobile front panel 39, which can slide underneath (or possibly on top of) the fixed rear panel 39 so as to open the respective part of the central portion 15.

According to a further embodiment (not illustrated), more than four panels 39 can be provided. Furthermore, according to different possible embodiments a single mobile panel 39 slides underneath a corresponding fixed panel 39 (as illustrated in FIGS. 16-20), or else a number of mobile panels 39 slide underneath one and the same fixed panel 39.

The folding top 6 described above presents many advantages, in so far as in the folded position it has reduced overall dimensions and is perfectly compatible with the characteristics of the motor vehicle 1 having a rear engine compartment 3 with transparent lid 4. Furthermore, in each configuration of the folding top 6, there is allowed complete accessibility to and usability of the rear area of the passenger compartment 2, set behind the seats and generally used for housing hand luggage. Finally, the transparent panel 28 having the functions of rear window is made of glass, with evident advantages in terms of visibility and acoustic insulation, and moreover enables installation of a defrosting and/or demisting device with electrically heated filaments.

The invention claimed is:

1. A folding top assembly for a motor vehicle, said top assembly being supported by a frame of the vehicle and being able to move between open and closed positions, said folding top assembly comprising:
    an outer frame member; and
    a cover member positioned on said frame member and covering the area inside the frame member;
    said frame member hinged to a frame of the motor vehicle so it can rotate about a first horizontal axis when the folding top passes from the open position to the closed position and vice versa;
    said frame member comprising two half-element members, said half-element members being connected together such that a first half-element member of said cover member positioned towards the front of the vehicle can be rotated, positioned and rested on the second half-element member of said cover member when the folding top passes from the closed position to the open position;
    wherein when said folding top is in the closed position, said two half-element members are substantially aligned with each other, and when said folding top is in the open position, said two half-element members are positioned substantially on top of one another and have a substantially C-shape.

2. The folding top assembly according to claim 1, in which, when the folding top assembly passes from the open position to the closed position or vice versa, the cover member performs a rotation through approximately 180° about said first horizontal axis with respect to the frame of the motor vehicle.

3. The folding top assembly according to claim 1, in which said two half-element members are hinged together so as to rotate with respect to one another about a second horizontal axis parallel to said first horizontal axis when the folding top assembly passes from the open position to the closed position or vice versa, said first half-element member rotates with respect to said second half-element member about said second horizontal axis.

4. The folding top assembly according to claim 3, in which when the folding top assembly passes from the open position to the closed position or vice versa, said first half-element member performs a rotation substantially of 180° about said second horizontal axis with respect to said second half-element member.

5. The folding top assembly according to claim 3, in which said first half-element member is connected to said second half-element member such that a top surface of the first half-element member rests on a top surface of said second half-element member.

6. The folding top assembly according to claim 3, in which said two half-element members are connected together such that said first half-element member performs a translation or rototranslation to set itself on top of said second half-element member.

7. The folding top assembly according to claim 1, wherein said outer frame member surrounds said cover member substantially on three sides.

8. The folding top assembly according to claim 1, wherein said outer frame member surrounds said cover member on four sides.

9. The folding top assembly according to claim 1, wherein said frame member comprises a pair of vertical uprights which are set on opposite sides of a passenger compartment, and wherein said frame member and vertical uprights perform the function of a roll-bar in the event the motor vehicle turns over.

10. The folding top assembly according to claim 1, further comprising a transparent panel member, which is set substantially vertical and defines a rear window.

11. The folding top assembly according to claim 10, wherein said transparent panel member is adapted to be moved in a substantially vertical direction between an extracted position in which said transparent panel member comes out of a bodywork, and a retracted position in which said transparent panel member is housed inside a bodywork of the vehicle.

12. The folding top assembly according to claim 1, wherein said first horizontal axis is a fixed axis.

13. The folding top assembly according to claim 1 further comprising two rear appendage members, said appendage members being hinged to said frame member and positioned substantially perpendicular to said cover member and substantially vertical when said cover member is in the closed position.

* * * * *